United States Patent
Meyer et al.

(10) Patent No.: US 9,811,477 B2
(45) Date of Patent: Nov. 7, 2017

(54) MEMORY SYSTEM AND METHOD FOR WRITING DATA TO A BLOCK OF AN ERASED PAGE

(71) Applicant: SanDisk Technologies Inc., Plano, TX (US)

(72) Inventors: David Meyer, Lakewood, CO (US); Satish Vasudeva, Fremont, CA (US)

(73) Assignee: SanDisk Technologies LLC, Plano, TX (US)

( * ) Notice: Subject to any disclaimer, the term of this patent is extended or adjusted under 35 U.S.C. 154(b) by 69 days.

(21) Appl. No.: 14/877,614

(22) Filed: Oct. 7, 2015

(65) Prior Publication Data
US 2017/0103025 A1   Apr. 13, 2017

(51) Int. Cl.
H04L 29/06 (2006.01)
G06F 12/14 (2006.01)
H04L 9/06 (2006.01)

(52) U.S. Cl.
CPC ........ *G06F 12/1408* (2013.01); *H04L 9/0618* (2013.01); *G06F 2212/1052* (2013.01); *H04L 2209/24* (2013.01)

(58) Field of Classification Search
CPC .................................................. G06F 12/1408
See application file for complete search history.

(56) References Cited

U.S. PATENT DOCUMENTS

| | | | |
|---|---|---|---|
| 5,081,677 A * | 1/1992 | Green | G06F 12/1408 380/281 |
| 6,480,950 B1 * | 11/2002 | Lyubashevskiy | G06F 12/1027 711/202 |
| 7,213,155 B2 * | 5/2007 | Sako | G11B 19/122 369/24.01 |
| 2010/0131773 A1 | 5/2010 | Cherian et al. | |
| 2012/0079289 A1 | 3/2012 | Weng et al. | |
| 2014/0237261 A1 * | 8/2014 | Diep | G06F 12/1408 713/189 |
| 2014/0337641 A1 | 11/2014 | Cherian et al. | |
| 2015/0235056 A1 * | 8/2015 | Cho | G06F 21/78 713/189 |
| 2016/0292431 A1 * | 10/2016 | Sreekanti | G06F 21/602 |

OTHER PUBLICATIONS

International Search Report and Written Opinion in corresponding International Application No. PCT/US2016/051524, dated Dec. 8, 2016, 11 pages.

* cited by examiner

*Primary Examiner* — Shawnchoy Rahman
(74) *Attorney, Agent, or Firm* — Brinks Gilson & Lione (57) ABSTRACT

In one embodiment, a memory system stores data encrypted with a cipher key in a block of a page in non-volatile memory, reads the cipher key version number associated with the page, determines whether the cipher key version number associated with the page is different from a cipher key version number of the cipher key used to encrypt the data and, if it is, writes a data pattern encrypted with the cipher key into the other blocks of the page, and stores the cipher key version number of the cipher key used to encrypt the data in the storage space in the non-volatile memory. Other embodiments are provided.

16 Claims, 7 Drawing Sheets

| LB | CIPHER KEY | CIPHER KEY VERSION NUMBER |
|---|---|---|
| 1 | 6 | 2 |
| 2 | 4 | 10 |
| 3 | 8 | 12 |
| 4 | 3 | 7 |
| ⋮ | ⋮ | ⋮ |
| Z | 5 | 1 |

| METADATA | CIPHER KEY VERSION 3 |
|---|---|
| Block 1 | 0 1 0 1 0 1 |
| Block 2 | 0 1 0 1 0 1 |
| Block 3 | 0 1 0 1 0 1 |
| Block 4 | NEW DATA |
| Block 5 | 0 1 0 1 0 1 |
| Block 6 | 0 1 0 1 0 1 |
| Block 7 | 0 1 0 1 0 1 |
| Block 8 | 0 1 0 1 0 1 |

MEMORY SYSTEM AND METHOD FOR WRITING DATA TO A BLOCK OF AN ERASED PAGE

BACKGROUND

Some memory systems use a cipher key to encrypt data before it is stored in memory and to decrypt encrypted data after it is read from memory. Some such memory system have their memory organized into separate virtual drives (or "bands"), each with its own secret encryption key. The Trusted Computing Group (TCG) is an organization that provides specifications on how memory can be organized into separate bands. In some situations, it is desired to erase all of the data stored in a band. To do so, the memory system can write 0s to the entire band. However, since a band can be many megabytes in size, doing so may be a very time-consuming process that can result in undesirable user delay. To avoid this delay and provide a "fast erase" operation, instead of erasing the data, the memory system can simply change the secret encryption key assigned to the band. By changing the cipher key assigned to the band, any read from a band will not return valid data because valid data is rendered only when using the same encryption key that was used to initially encrypt the data. That is, even though the encrypted data is still stored in the band, it can never be properly decrypted once the cipher key has been changed. Since the encrypted data can never be read properly, it can be effectively considered "erased."

DETAILED DESCRIPTION

By way of introduction, the below embodiments relate to a memory system and method for writing data to a block of an erased page. In one embodiment, a memory system is provided comprising a non-volatile memory comprising a page, wherein the page comprises a plurality of blocks, and wherein the non-volatile memory is configured with storage space for storing a cipher key version number associated with the page. The memory system also comprises a controller in communication with the non-volatile memory. The controller is configured to store data encrypted with a cipher key in one of the blocks of the page in the non-volatile memory; read the cipher key version number associated with the page from the storage space in the non-volatile memory; determine whether the cipher key version number associated with the page is different from a cipher key version number of the cipher key used to encrypt the data; in response to determining that the cipher key version number associated with the page is different from the cipher key version number of the cipher key used to encrypt the data, write a data pattern encrypted with the cipher key into the other blocks of the page; and store the cipher key version number of the cipher key used to encrypt the data in the storage space in the non-volatile memory.

In some embodiments, the controller is further configured to perform the following in response to a request to read one of the blocks of the page: read the cipher key version number associated with the page from the storage space in the non-volatile memory; determine whether the cipher key version number read from the storage space in the non-volatile memory is out of date; and in response to determining that the cipher key version number read from the storage space in the non-volatile memory is out of date, return a data pattern instead of returning data read from the one of the blocks and decrypted using the out-of-date encryption key.

In some embodiments, the storage space is a metadata field for the page.

In some embodiments, the cipher key is stored in the controller.

In some embodiments, the page is part of one of a plurality of virtual drives in the non-volatile memory, wherein each virtual drive is associated with its own encryption key.

In another embodiment, a method is provided that is performed in a memory system having non-volatile memory. The method comprises the following: storing data encrypted with a cipher key in a subset of a set of memory cells in the non-volatile memory; reading a cipher key version number associated with the set; determining whether the cipher key version number associated with the set is different from a cipher key version number of the cipher key used to encrypt the data; in response to determining that the cipher key version number associated with the set is different from the cipher key version number of the cipher key used to encrypt the data, writing a data pattern encrypted with the cipher key into other subsets of the set; and storing the cipher key version number of the cipher key used to encrypt the data.

In some embodiments, the method further comprises: reading the cipher key version number associated with the set; determining whether the read encryption key version number is out of date; and in response to determining that the read encryption key version number is out of date, returning a data pattern.

In some embodiments, the set is part of one of a plurality of virtual drives in the non-volatile memory, wherein each virtual drive is associated with its own encryption key.

In another embodiment, a method is provided that is performed in a memory system having non-volatile memory organized into a plurality of bands, wherein each band is associated with its own encryption key. The method comprises: storing data encrypted with a cipher key in a band that has been previously erased by changing a cipher key associated with the band; reading the cipher key version number associated with the band; determining whether the read encryption key version number is different from a cipher key version number of the cipher key used to encrypt the data; in response to determining that the read encryption key version number is different from the cipher key version number of the cipher key used to encrypt the data, writing a data pattern encrypted with the cipher key into other locations in the band; and storing the cipher key version number of the cipher key used to encrypt the data.

In some embodiments, the method further comprises reading the cipher key version number associated with the band; determining whether the read encryption key version number is out of date; and in response to determining that the read encryption key version number is out of date, returning a data pattern.

In some embodiments, the memory is a three-dimensional memory.

In some embodiments, the memory system is embedded in a host, while, in other embodiments, the memory system is removably connected to a host.

Other embodiments are possible, and each of the embodiments can be used alone or together in combination.

As mentioned above, these embodiments generally relate to a memory system and method for writing data to a block of an erased page. Before turning to several examples, the follow paragraphs present an exemplary memory system that can be used with these embodiments.

Figure 1:
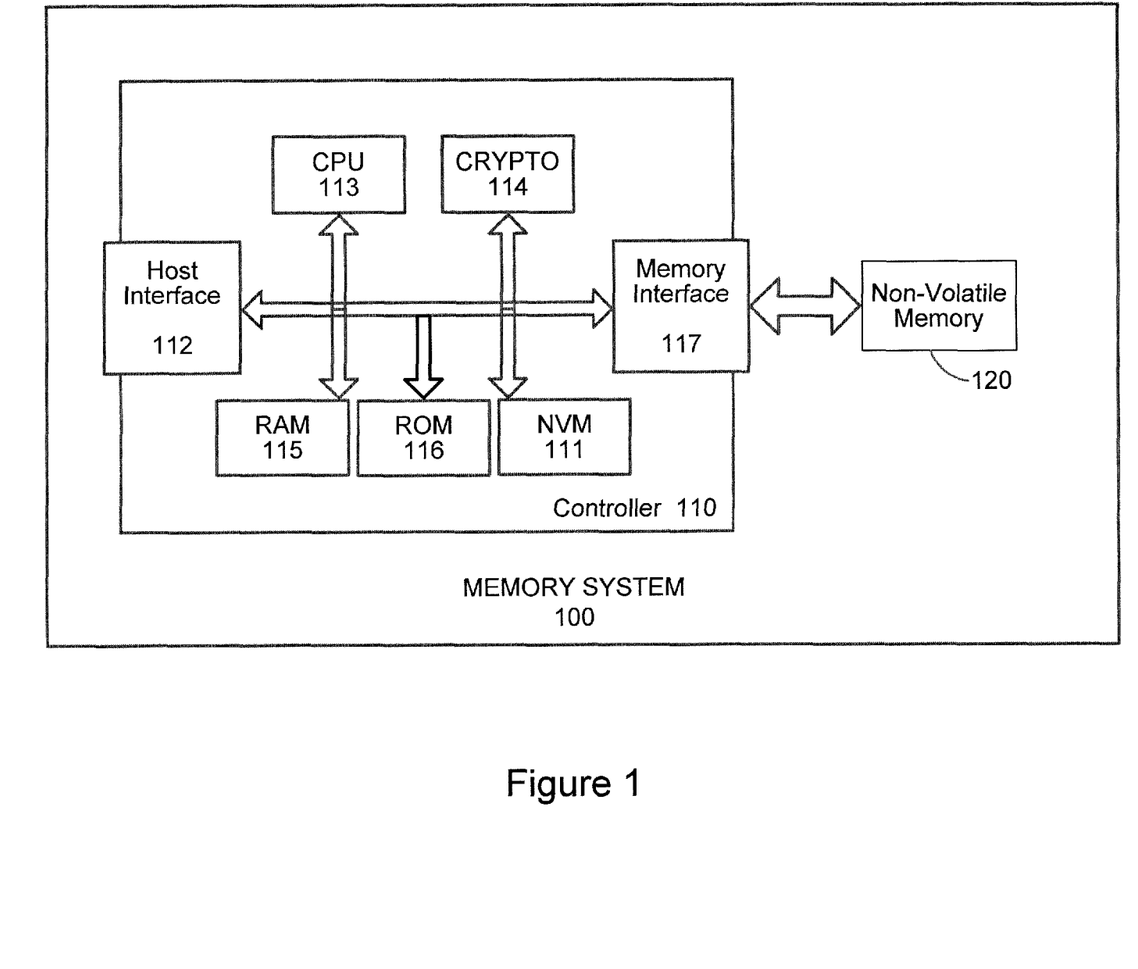
FIG. 1 is a block diagram of an exemplary memory system of an embodiment.

Turning now to the drawings, FIG. 1 is a block diagram of a memory system 100 of an embodiment. As shown in FIG. 1, the memory system 100 of this embodiment comprises a controller 110 in communication with a non-volatile memory 120. As used herein, the phrase "in communication with" could mean directly in communication with or indirectly in communication with through one or more components, which may or may not be shown or described herein.

In general, the controller 110 transmits command sequences for read, program, and erase operations to the non-volatile memory 120, and performs other functions, as will be discussed below. The controller 110 can be implemented in any suitable manner. For example, the controller 110 can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 110 can be configured with hardware and/or firmware to perform the various functions described below and shown in the flow diagrams. Also, some of the components shown as being internal to the controller 110 can also be stored external to the controller 110, and other components can be used.

In one embodiment, the non-volatile memory 120 takes the form of a plurality of memory dies. As used herein, the term "die" refers to the collection of non-volatile memory cells, and associated circuitry for managing the physical operation of those non-volatile memory cells, that are formed on a single semiconductor substrate. A memory die may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

As shown in FIG. 1, in one embodiment, the memory system's controller 110 comprises a non-volatile memory 111, a host interface (or host interface module (HIM)) 112, a memory (or backend) interface 117, random access memory (RAM) 115, read only memory (ROM) 116 (e.g., to store system boot code), a central processing unit (CPU) (or "processor"), and a crypto-engine 114 to provide encryption and/or decryption operations. In one embodiment, the cipher key used in the encryption and/or decryption process is stored in the non-volatile memory 111 in the controller 110. Of course, the cipher key can be stored in other locations (shown or not shown) in the controller 110 or memory system 100 (or even outside of the memory system 100, if desired). Also, it should be noted that other or different components can be used. For example, the controller 100 can contain an error correction controller (ECC) engine to encode/decode data written to and read from the non-volatile memory 120. The host interface 112 can take any suitable form, such as, but are not limited to, a SATA, SATA Express, SAS, Fibre Channel, USB, PCIe, and NVMe interface. The memory interface 117 can also take any suitable form, such as, but not limited to, a flash interface (e.g., Toggle Mode 200, 400, or 800).

In operation, the CPU 113 can read computer-readable program code (e.g., stored in ROM 116, RAM 115, or the memory 120) and execute that code to perform several functions, such as those discussed below and illustrated in the flow charts. More generally, the controller 110 can contain "circuitry" configured to perform various operations. As used herein, the term "circuitry" can refer to an instruction processor, such as a Central Processing Unit (CPU), microcontroller, or a microprocessor; or an Application Specific Integrated Circuit (ASIC), Programmable Logic Device (PLD), or Field Programmable Gate Array (FPGA); or a collection of discrete logic or other circuit components, including analog circuit components, digital circuit components or both; or any combination thereof. Circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, "circuitry" may store or access instructions for execution or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs and part of a library, such as a shared library like a Dynamic Link Library (DLL). The library, for example, may contain shared data and one or more shared programs that include instructions that perform any of the processing described above or illustrated in the drawings, when executed by the circuitry. Accordingly, "circuitry" may be implemented in many different ways and in many different combinations of hardware and software.

The memory system 100 can take any suitable form. For example, the memory system 100 can be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The memory system 100 can also take the form of an embedded mass storage device, such as an eSD/eMMC embedded flash drive or an embedded or removable solid state drive (SSD) (e.g., client SSDs found in portable computing devices (such as laptop computers and tablet computers) and enterprise SSDs).

Figure 2A:
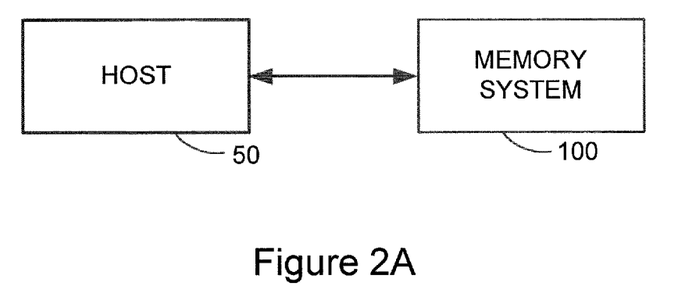
FIG. 2A is a block diagram of a memory system of an embodiment removably connected to a host.
Figure 2B:
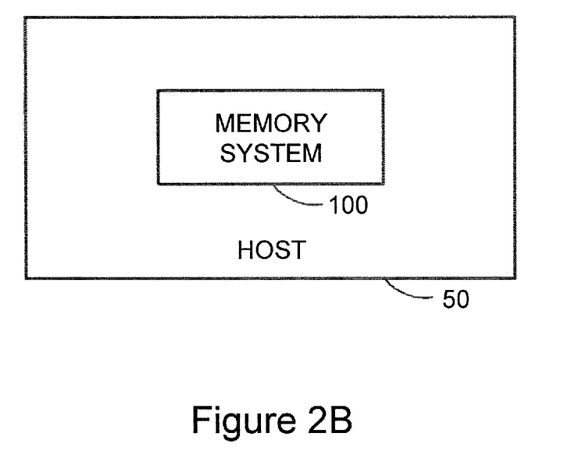
FIG. 2B is a block diagram of a memory system of an embodiment embedded in a host.

As shown in FIG. 2A, in some embodiments, the memory system 100 is removably connected to a host 50 (e.g., where the host 50 and memory system 100 can each have mating physical connectors that allow the memory system 100 to be removably connected to the host 50). In other embodiments (shown in FIG. 2B), the memory system 100 is embedded in a host 50 (FIG. 2B).

A host can take any suitable form. A host 50 typically has a controller and an interface for communicating with the memory system 100. In some implementations, the host 50 has a crypto-engine operative to provide encryption and/or decryption operations for communication with the memory system 100 (e.g., for mutual authentication, key exchange, and establishment of a secure channel). The host 50 can contain other components (e.g., a display device, a speaker, a headphone jack, a video output connection, etc.). Examples of hosts 50 include, but are not limited to, a mobile phone, a digital media player, a game device, a personal digital assistant (PDA), a personal computer (PC), a kiosk, a set-top box, a TV system, a book reader, or any combination thereof.

Figure 3:
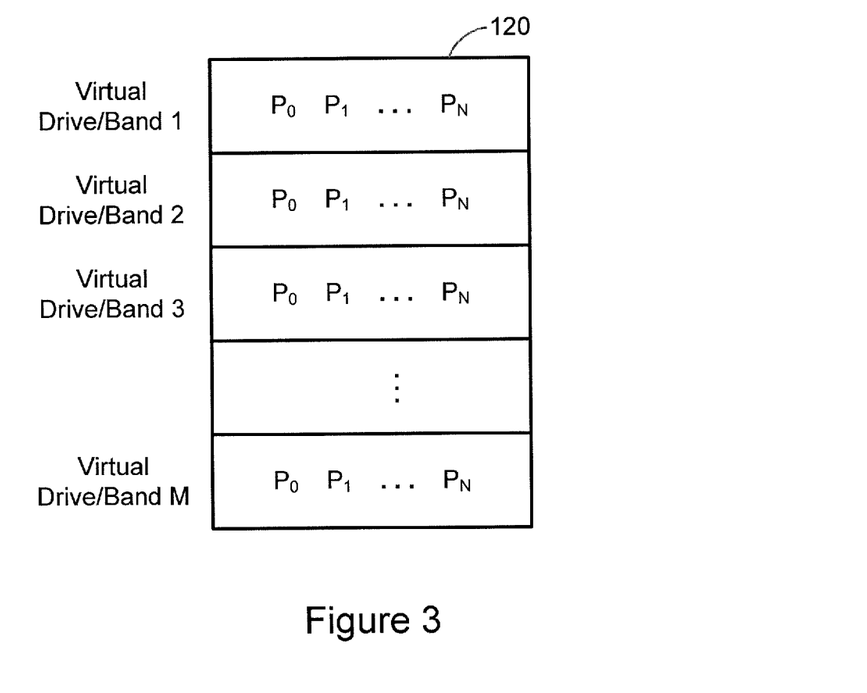
FIG. 3 is a diagram of a memory architecture of an embodiment.

The memory 120 can be organized in any suitable manner. For example, in one embodiment, the memory 120 is organized into separate virtual drives (or "bands"), where each band has its own secret encryption key. The memory 120 can be organized into separate bands according to specifications set forth by the Trusted Computing Group (TCG), for example (other organizations and specifications can be used). FIG. 3 is a diagram of one exemplary memory organization. As shown in FIG. 3, the memory 120 is organized into M virtual drives/bands. Each band can be many megabytes in size.

In this embodiment, each band has a plurality of pages. While FIG. 3 shows each band having the same number of pages, in other embodiments, one or more bands can have different numbers of pages. In this embodiment, a page comprises a plurality of blocks. For example, in one embodiment, there may be eight blocks in one page (of course, this is just an example; and other ratios can be used). It should be noted that the terms "page" and "block" are used herein for simplicity to indicate a granularity (a set and subset), with a "page" having several "blocks." Other than this level of granularity, no other limitations or implications should be read into those terms. Also, in this embodiment, "page" and "block" will generally refer to a logical page or a logical block. However, in other embodiments, a physical page or physical block may be used. It should also be noted while the following examples will be discussed in terms of virtual drives/bands, it should be understood that these embodiments can be used with memories that are not organized into virtual drives/bands. So, the use of virtual drives/bands should not be read into the claims unless expressly recited therein.

As discussed above, in some situations, it is desired to erase all of the data stored in a band. To do so, the memory system 100 can write 0s to the entire band. However, since a band can be many megabytes in size, doing so may be a very time-consuming process that can result in undesirable user delay. To avoid this delay and provide a "fast erase" (or "secure erase") operation, instead of erasing the data, the memory system 100 can simply change the secret encryption key assigned to the band. By changing the cipher key assigned to the band, any read from band will not return valid data because valid data is rendered only when using the same encryption key that was used to initially encrypt the data. That is, even though the encrypted data is still stored in the band, it can never be properly decrypted once the cipher key has been changed. Since the encrypted data can never be read properly, it can be effectively considered "erased." The following paragraphs provide a simplified example of this operation.

In this example, say we want to write the data value of 5 to the memory 120 after encrypting that data value with a cipher key having a key value of 1. To do so, the controller 110 (e.g., the cryptoengine 114) would encrypt the data by adding the key to it: 5+1=6. The encrypted value of 6 would then be written to the memory 120. To read the data back, the controller 110 would read the encrypted value of 6 from the memory 120 and decrypt the data by subtracting the key: 6−1=5. Note that the actual value of 5 was not written to the memory 120; only the encrypted value was, which is how the memory system 100 keeps the data secret.

With a fast erase/secure erase operation of a band, the secret encryption key assigned to the band (e.g., as set forth in a table or other data structure stored in the controller 110 or other location in the memory system 100) is changed. Continuing with the example provided above, let's say the memory system 100 changes the cipher key from 1 to 2 to "erase" the band. When the memory system 100 reads the encrypted value of 6 from the memory 120, the memory system 100 will decrypt the data by subtracting the new key value from the data: 6−2=4, which is different from the valid data 5.

As can be seen by this example, the technique of changing the band's encryption key allows the memory system 100 to "erase" (make unreadable) all the data in the entire band very quickly. The process of overwriting the cipher key with a new value is sometimes referred to herein as "secure erase" because even though the encrypted data is still in the memory 120, it cannot be properly decrypted once the key used to encrypt the data has changed. Since the data cannot be read properly, the data in the band can be considered effectively erased.

Figure 4:
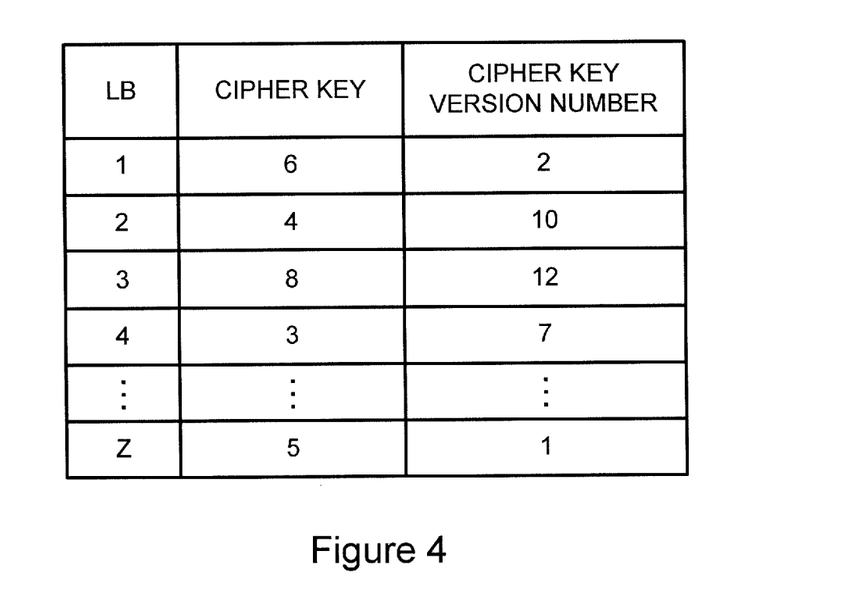
FIG. 4 is a diagram of a table of an embodiment.

There are several implications of this. For example, when a band is erased by changing the cipher key, a user might expect that a read after a secure erase would return a value of 0, since data in the band was "erased." However, as shown in the above example, the value of 4 (not 0) was returned. To address this, the memory system 100 can remember what key a given logical block (LB) was written with, and when reading, compare the key that the memory system 100 is currently using to the key that was used to write the data. If the keys are different, the memory system 100 can return a 0 (or some data pattern) to the user instead of the decrypted value. To provide this solution, the memory system 100 can write a key version number with each "chunk" of data (e.g., LB) that the memory system 100 writes, so that when data is read, the memory system 100 can compare the key version number read from the memory 120 to the current key version number in use. FIG. 4 is an example of a table that can be stored in the controller 110 (or other location in the memory system 100) that associates an LB address with a cipher key and the cipher key version number. (Alternatively, following a secure erase operation, the memory system 100 can mark each item written with a tag (unmap) indicating that it has been secure erased. However, this can be a time-consuming operation.

So, with respect to the above example, let's assume we start with a data value of 5, a cipher key value of 1, and a cipher key version number of 7. The memory system 100 would encrypt the data by adding the key to it: 5+1=6. Then, the memory system 100 would store the encrypted value of 6 and the key version number of 7.

To do a secure erase, the memory system 100 would change the key value to 2 and bump the key version number up to 8. During a read operation, the memory system 100 would read the encrypted value of 6 from the memory 120 along with the key version number of 7 and compare the current key version number (8) to the key version number attached to the data (7). Since the key versions are different, the memory system would return a value of 0 to the user, instead of the incorrect value calculated using the wrong encryption key. Instead of returning a value of 0, the memory system 100 can return a data pattern. The ability to provide a data pattern when reading an erased block is another advantage over writing 0s to the entire band, which would return 0s when read.

As can be seen by the above example, with the capability of changing keys within a band on the fly, all the data that was encrypted with the previous key is effectively discarded in a similar fashion as a secure erase. In addition, a fixed pattern can be returned instead of 0s or random data as may be the case when decrypting with an invalid key.

Figure 5:
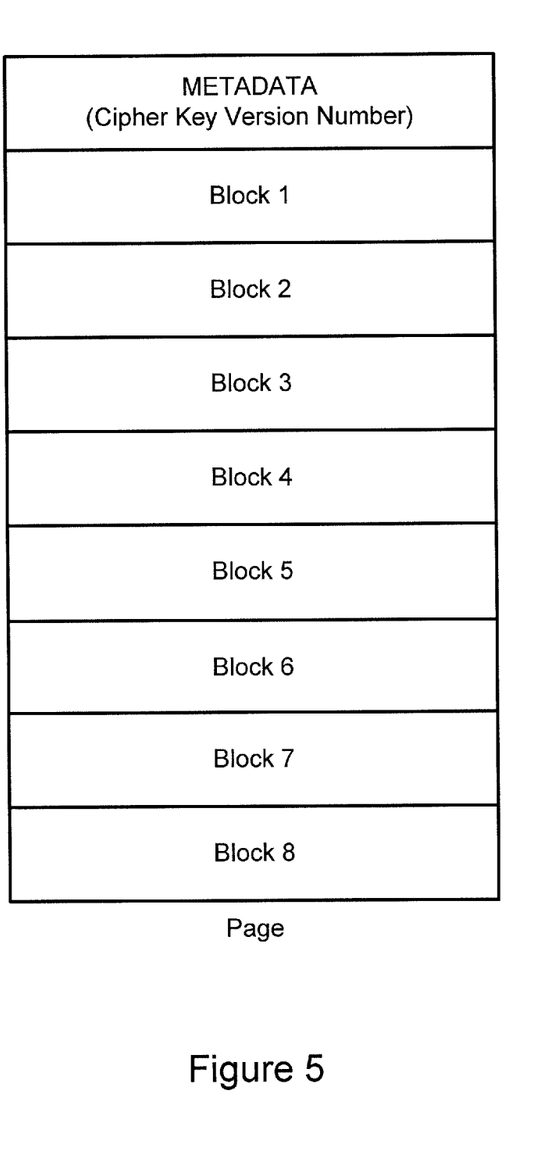
FIG. 5 is a diagram of a page of an embodiment.

As discussed above with respect to FIG. 4, one way in which to accomplish the secure erase operation is to store a key version number corresponding to every logical block maintained in the memory 120. In one embodiment, the key version number is stored "in the clear" (i.e., not encrypted). After a logical block is encrypted and written to the memory 120, the key version field can be updated with the latest version number. Before a logical block is read from the memory 120 and decrypted, the key version field can be read. If the version is out of date, a fixed pattern can be returned to the user instead of reading the memory 120 and decrypting. However, to reduce overhead, instead of storing a key version field for every logical block maintained in the memory 120, the memory system 100 can maintain a key version field for every logical page maintained in the memory 120. For example, FIG. 5 shows a logical page having 8 logical blocks. The same key would be used when writing data to or reading data from the page, and the key version number for the page can be stored in a metadata field for the page. Of course, the key version number can be stored in a different location in the page or external to the page. Accordingly, the phrase "storage space for storing a cipher key version number" will be used herein to refer to the area in which the cipher key version number is stored, with the understanding that such a storage space can be in any suitable location.

Figure 6:
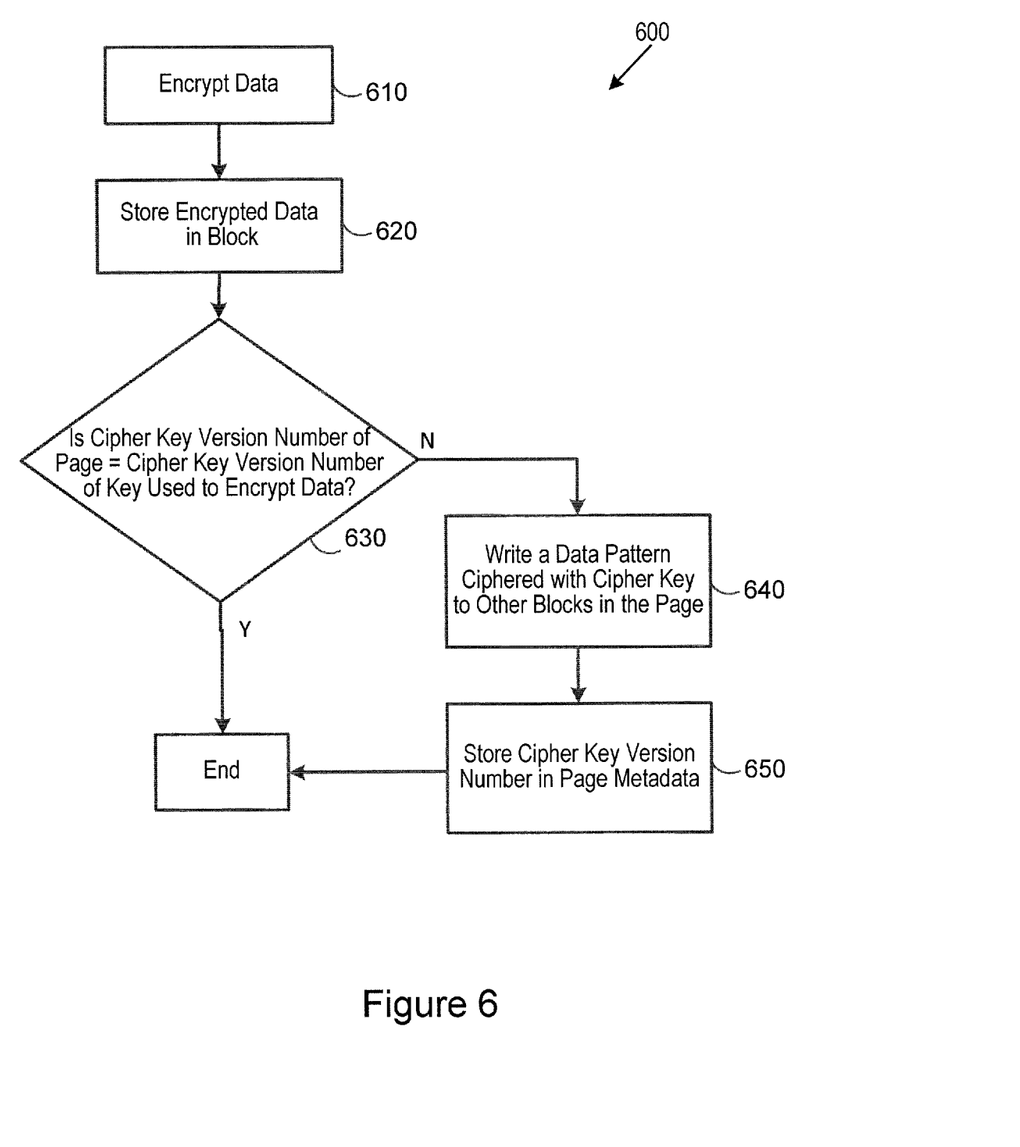
FIG. 6 is a flow chart of a method of an embodiment for writing data to memory.

However, while reducing overhead, using a single encryption key for all the blocks in a page can present challenges during unaligned writes due to the potential to mix logical blocks encrypted with different keys. For example, if a new encryption key is used to encrypt data to be written to a block in a page and the new key version number is written to the metadata field, that new key will be used to decrypt data read from any of the blocks in the page—irrespective of whether that block is "erased." This can result in invalid data being returned. FIG. 6 is a flowchart 600 of a method of an embodiment that can be used to address this issue.

Figure 7:
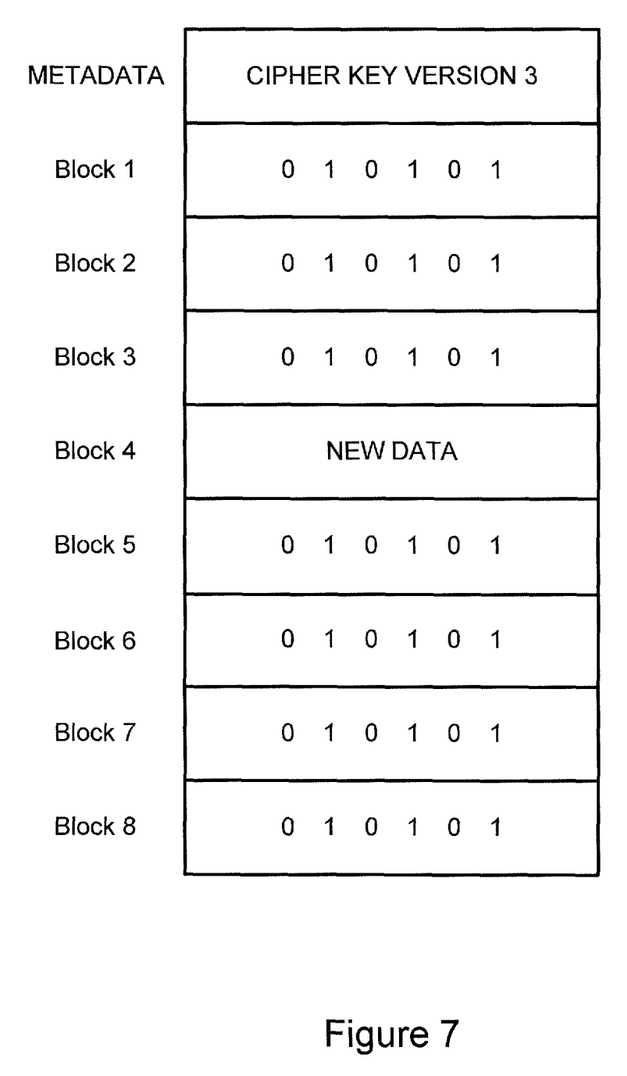
FIG. 7 is a diagram of a page of an embodiment.

As shown in FIG. 6, the memory system 100 (e.g., the controller 110 or the cryptoengine 114) encrypts data (act 610) and stores the encrypted data in a block in a page (act 620). Next, the memory system 100 (e.g., the controller 110) determines if the key version number stored in the metadata field of the page is the same as the cipher key version number of the key used to encrypt the data (act 630). If it is, the "unaligned write" problem does not occur because the key version number that is stored in the metadata field of the page is appropriate for all the blocks in the page. However, if the version numbers do not match, that means that data stored in the other blocks in the page have been "erased." So, using the new encryption key to decrypt those other blocks will result in returning invalid data. To avoid this, the memory system 100 can write a data pattern (0s or otherwise) encrypted with the new encryption key to the other blocks in the page (act 640) and then store the cipher key version number in the page metadata (act 650). This is illustrated in FIG. 7, with the data pattern "0 1 0 1 0 1" being stored in the other blocks in the page after block 4 has been written with new data.

In one particular exemplary implementation, this method is performed by reading a page of the memory 120 and storing it in volatile memory (e.g. RAM 115). In this way, for unaligned logical page writes, the controller 110 would fetch old logical blocks to fill the logical page. If the key version is out of date, the controller 110 can generate a fixed pattern in each of the "old" logical blocks and encrypt them with the new key. This allows the logical page to be read with the new key even though it contains "old" logical blocks. The new key version would them be written into the logical page metadata, and the logical page stored in RAM 115 would then be written to the non-volatile memory 120.

Figure 8:
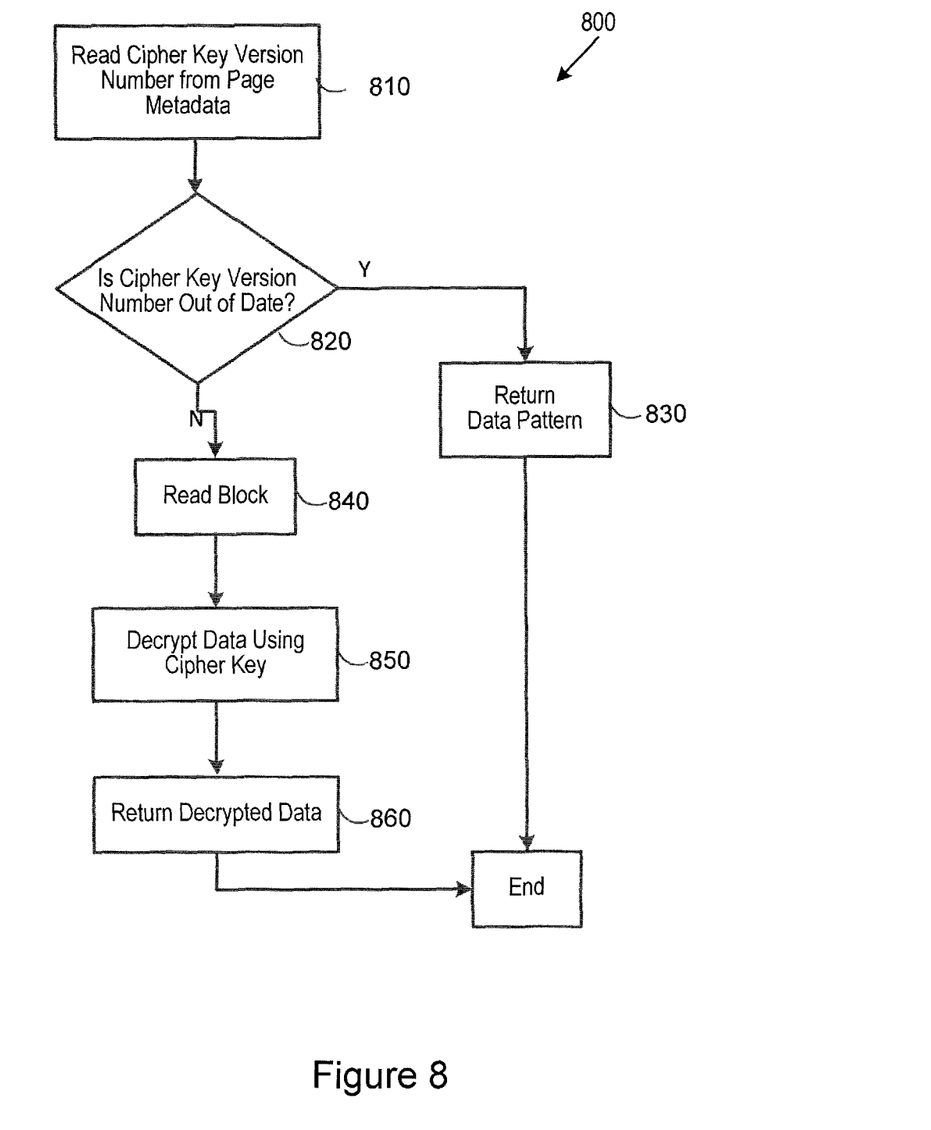
FIG. 8 is a flow chart of a method of an embodiment for reading data from memory.

By using this method, when any of the other blocks in the page are read, the result will be an intended data pattern indicating an erased block, instead of invalid data. This is illustrated in the flow chart 800 in FIG. 8. As shown in FIG. 8, during a read operation, the memory system 100 (e.g., the controller 110) reads the cipher key version number from the page metadata (act 810) and determines if the cipher key version number is out of date with respect to the current encryption key version number that the controller 110 is currently using to encrypt data (act 820). If the cipher key version number is out of date, this means that all of the bands in the page have been "erased" and should not be decrypted (because invalid data would be returned). In this case, the controller 110 returns a data pattern (e.g., one that is recognized as indicated an erased band) (act 830).

If the cipher key version number for the page is not out of date, all of the bands in the page have some form of "good" data in them—either valid encrypted data or an encrypted data pattern indicating an erased band. As such, the controller 110 can read the block (act 840), decrypt the data in the block using the cipher key (act 850), and return the decrypted data (act 860). Again, the returned decrypted data will actually be data that was stored or a data pattern indicating an erased block.

As seen by these examples, this embodiment provides the advantages of reducing the amount of time and storage overhead to perform a band erase, while overcoming the "unaligned write" problem.

It should be noted that the order of some of these acts can be changed. So, the acts recited in the claims should be not read to necessarily require them to be performed in the order in which they are written.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory system comprising:
    a non-volatile memory comprising a page, wherein the page comprises a plurality of blocks, and wherein the non-volatile memory is configured with storage space for storing a cipher key version number associated with the page; and
    a controller in communication with the non-volatile memory, wherein the controller is configured to perform the following in response to a write command:
        store data encrypted with a cipher key in one of the blocks of the page in the non-volatile memory;
        read the cipher key version number associated with the page from the storage space in the non-volatile memory;
        determine whether the cipher key version number associated with the page is different from a cipher key version number of the cipher key used to encrypt the data;
        in response to determining that the cipher key version number associated with the page is different from the cipher key version number of the cipher key used to encrypt the data, write a data pattern encrypted with the cipher key into the other blocks of the page, wherein the data pattern indicates data previously stored in the other blocks of the page was previously made unreadable by a change in the cipher key; and
        store the cipher key version number of the cipher key used to encrypt the data in the storage space in the non-volatile memory;
    wherein the controller is further configured to perform the following in response to a request to read the one of the blocks of the page:
        read the cipher key version number associated with the page from the storage space in the non-volatile memory;
        determine whether the cipher key version number read from the storage space in the non-volatile memory is out of date; and
        in response to determining that the cipher key version number read from the storage space in the non-volatile memory is out of date, return a second data pattern instead of returning data read from the one of the blocks, wherein the second data pattern indicates data previously stored in the one of the blocks was previously made unreadable by a change in the cipher key.

2. The memory system of claim 1, wherein the storage space is a metadata field for the page.

3. The memory system of claim 1, wherein the cipher key is stored in the controller.

4. A memory system comprising:
    a non-volatile memory comprising a page, wherein the page comprises a plurality of blocks, and wherein the non-volatile memory is configured with storage space for storing a cipher key version number associated with the page; and
    a controller in communication with the non-volatile memory, wherein the controller is configured to perform the following in response to a write command:
        store data encrypted with a cipher key in one of the blocks of the page in the non-volatile memory;
        read the cipher key version number associated with the page from the storage space in the non-volatile memory;
        determine whether the cipher key version number associated with the page is different from a cipher key version number of the cipher key used to encrypt the data;
        in response to determining that the cipher key version number associated with the page is different from the cipher key version number of the cipher key used to encrypt the data, write a data pattern encrypted with the cipher key into the other blocks of the page, wherein the data pattern indicates data previously stored in the other blocks of the page was previously made unreadable by a change in the cipher key; and
        store the cipher key version number of the cipher key used to encrypt the data in the storage space in the non-volatile memory;
    wherein the page is part of one of a plurality of virtual drives in the non-volatile memory, wherein each virtual drive is associated with its own cipher key.

5. The memory system of claim 1, wherein the non-volatile memory comprises a three-dimensional memory.

6. The memory system of claim 1, wherein the memory system is embedded in a host.

7. The memory system of claim 1, wherein the memory system is removably connected to a host.

8. A method for writing data to memory, the method comprising:
    performing the following in a memory system having non-volatile memory:
        in response to a write command:
            storing data encrypted with a cipher key in a subset of a set of memory cells in the non-volatile memory;
            reading a cipher key version number associated with the set of memory cells;
            determining whether the cipher key version number associated with the set of memory cells is different from a cipher key version number of the cipher key used to encrypt the data;
            in response to determining that the cipher key version number associated with the set of memory cells is different from the cipher key version number of the cipher key used to encrypt the data, writing a data pattern encrypted with the cipher key into other subsets of the set of memory cells, wherein the data pattern indicates data previously stored in the other subsets of the set of memory cells was previously made unreadable by a change in the cipher key;
            storing the cipher key version number of the cipher key used to encrypt the data;

in response to a command to read the sub-set of memory cells:
        reading the cipher key version number associated with the set of memory cells:
        determining whether the cipher key version number is out of date; and
    in response to determining that the cipher key version number is out of date, returning a second data pattern, wherein the second data pattern indicates data previously stored in the sub-set of memory cells was previously made unreadable by a change in the cipher key.

9. The method of claim 8, A method for writing data to memory, the method comprising:
    performing the following in a memory system having non-volatile memory:
        in response to a write command:
            storing data encrypted with a cipher key in a subset of a set of memory cells in the non-volatile memory;
            reading a cipher key version number associated with the set of memory cells:
            determining whether the cipher key version number associated with the set of memory cells is different from a cipher key version number of the cipher key used to encrypt the data;
            in response to determining that the cipher key version number associated with the set of memory cells is different from the cipher key version number of the cipher key used to encrypt the data, writing a data pattern encrypted with the cipher key into other subsets of the set of memory cells, wherein the data pattern indicates data previously stored in the other subsets of the set of memory cells was previously made unreadable by a change in the cipher key; and
            storing the cipher key version number of the cipher key used to encrypt the data;
    wherein the set of memory cells is part of one of a plurality of virtual drives in the non-volatile memory, wherein each virtual drive is associated with its own encryption key.

10. The method of claim 8, wherein the non-volatile memory comprises a three-dimensional memory.

11. The method of claim 8, wherein the memory system is embedded in a host.

12. The method of claim 8, wherein the memory system is removably connected to a host.

13. A memory system comprising:
    a non-volatile memory organized into a plurality of bands, wherein each band is associated with its own encryption key;
    means for, in response to a write command:
        storing data encrypted with a cipher key in a band that has been previously erased by changing a cipher key associated with the band;
        reading the cipher key version number associated with the band;
        determining whether the cipher key version number is different from a cipher key version number of the cipher key used to encrypt the data;
        in response to determining that the cipher key version number is different from the cipher key version number of the cipher key used to encrypt the data, writing a data pattern encrypted with the cipher key into other locations in the band, wherein the data pattern indicates data previously stored in the other locations in the band was previously made unreadable by a change in the cipher key; and
        storing the cipher key version number of the cipher key used to encrypt the data;
    means for determining, during a read operation, whether the cipher key version number is out of date; and
    means for in response to determining that the cipher key version number is out of date, returning a second data pattern, wherein the second data pattern indicates data previously stored in the band was previously made unreadable by a change in the cipher key.

14. The memory system of claim 13, wherein the non-volatile memory comprises a three-dimensional memory.

15. The memory system of claim 13, wherein the memory system is embedded in a host.

16. The memory system of claim 13, wherein the memory system is removably connected to a host.

* * * * *